2,897,141
HYDRODESULFURIZATION OF REFORMER CHARGE

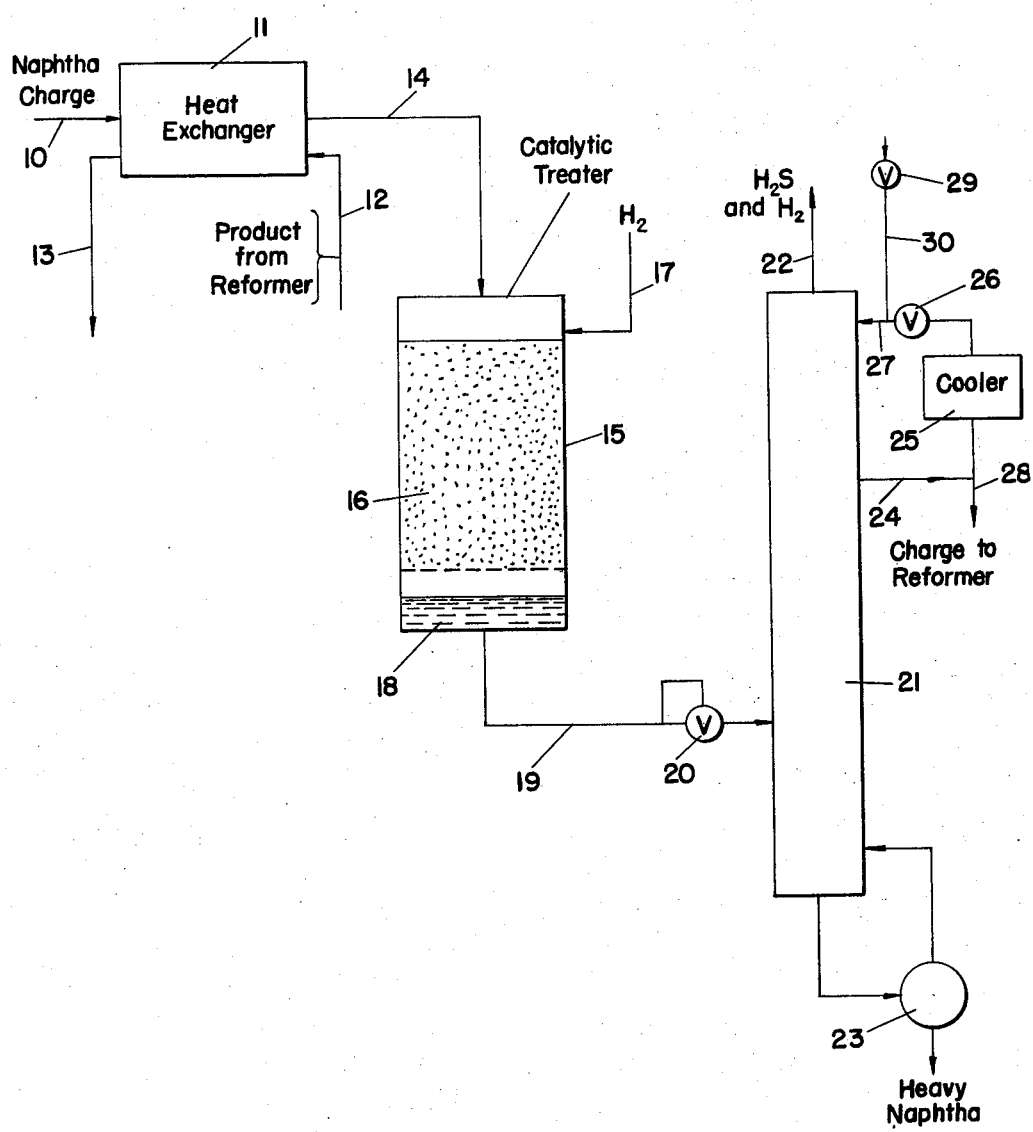

Earl M. Honeycutt, West Chester, and Frank R. Shuman, Chester Springs, Pa., assignors to Sun Oil Company, Philadelphia, Pa., a corporation of New Jersey Application August 31, 1956, Serial No. 607,327

2 Claims. (Cl. 208—209)

This invention relates to the desulfurization of hydrocarbon fractions. It is directed more particularly to the treatment of naphtha for the purpose of making it more suitable as a charge material for reforming operations which utilize sulfur-sensitive reforming catalysts.

It is common practice in the petroleum industry to subject naphtha fractions to hydroreforming operations in the presence of a suitable reforming catalyst, particularly platinum deposited on an alumina base. These catalysts are sensitive to sulfur compounds normally present in the naphtha and may rapidly lose their effectiveness for promoting the desired reforming reactions if the sulfur content of the feed is too high. In order to maintain the desired catalytic activity over extended periods of operation, the feed naphthas are often subjected to a pretreatment adapted to remove most of the sulfur present in the original naphtha stock. The desulfurized stock is then charged to the reformer, and the desired catalytic conversion reactions are effected for a considerably longer operating time than could be obtained if the charge were not pretreated. Furthermore, desulfurizing the feed to the reformer increases the reformate yield.

The most common procedure used for desulfurizing reformer charge stocks involves hydrodesulfurization of the stock in the presence of a sulfactive hydrogenation catalyst. Numerous catalysts of this type are known. They include the oxides or sulfides of molybdenum, chromium, vanadium, nickel and tungsten which in some cases are used in combination with various other components as promoters. These catalytic materials generally are incorporated in a suitable porous support such as activated alumina, and the catalyst ordinarily is employed in the desulfurization operation in the form of a stationary bed of granular particles. Usually the operation is conducted with the hydrocarbon charge in vapor phase, the vaporized charge being fed along with hydrogen into and through the catalyst zone at elevated temperature and pressure. This converts most of the organic sulfur compounds in the naphtha charge to hydrogen sulfide. The effluent from the reaction zone passes to condensers and then to separators wherein the excess hydrogen together with hydrogen sulfide is separated from the hydrocarbons. The hydrogen is then treated in a scrubbing operation to remove the hydrogen sulfide, folowing which the hydrogen is passed through compressors and is recycled to the desulfurization zone along with make-up hydrogen.

The above-described vapor phase type of operation generally has been the procedure employed heretofore in desulfurizing reformer charge stocks. It has also been proposed to desulfurize naphtha stocks in a liquid phase operation wherein the feed is maintained at least partially in liquid phase and is passed together with hydrogen in vapor phase through a bed of the desulfurizing catalyst. In either type of operation it has been considered necessary heretofore to utilize a considerable excess of hydrogen in order to prevent the activity of the catalyst from declining too rapidly. Consequently, both the vapor phase operation and the heretofore proposed liquid phase operation involve the withdrawal of considerable amounts of excess hydrogen vapor together with the hydrocarbon effluent from the desulfurizing zone. This makes it necessary to recover and recycle the excess hydrogen in order to avoid uneconomic operation. The recovery and recycling of the excess hydrogen inevitably entail the use of separators, scrubbers and compressors, all of which add to the expense of the operation.

The present invention is directed to an improved desulfurizing operation wherein the hydrocarbon feed is maintained essentially entirely in the liquid phase and the recovery and recycling of hydrogen is completely avoided. It has now been found that efficient desulfurizing conditions can be maintained for extended operating periods and without loss of catalytic activity by operating without employing any excess hydrogen in the desulfurization zone as hereinafter fully described. By excess hydrogen is meant any amount which is over and above the total of that required to convert the sulfur compounds to hydrogen sulfide plus the amount which will be dissolved in the treated naphtha under the temperature and pressure conditions prevailing in the desulfurization zone.

According to the invention a naphtha feed stock is desulfurized, prior to reforming in the presence of a sulfur-sensitive catalyst, by percolating the feed under hydrodesulfurizing conditions of temperature and pressure through a bed of granular desulfurizing catalyst. Hydrogen is added to the reaction zone only in that amount which is required to react with the organic sulfur compounds and other non-hydrocarbons, plus the amount that becomes dissolved in the hydrocarbon effluent that leaves the zone. This is accomplished merely by feeding hydrogen to the desulfurizing zone in an amount that will maintain the desired pressure while avoiding any withdrawal of vapor phase hydrogen from the zone. As the feed stock percolates through the catalyst bed, hydrogen from the vapor phase diffuses into the hydrocarbon film on the catalyst surfaces and reacts with the organic sulfur compounds to convert them to hydrogen sulfide. After equilibrium operating conditions have been established, all the hydrogen sulfide formed remains dissolved in the liquid hydrocarbon phase. Hence, all the so-formed hydrogen sulfide leaves the reaction zone in solution in the hydrocarbon effluent, which also contains the relatively small equilibrium amount of hydrogen that dissolves in the effluent under the temperature and pressure conditions prevailing in the desulfurization zone. The hydrocarbon effluent is then fed to a fractionating column and the dissolved hydrogen and hydrogen sulfide are stripped from the hydrocarbons. In view of the fact that the hydrogen removed in this manner along with the hydrogen sulfide is only the relatively small amount capable of dissolving in the treated naphtha, it is much more economical to discard it from the system than to provide equipment for recovering and recycling it. Accordingly, the need for scrubbers and compressors as required by conventional practice is eliminated, as also is the necessity for vaporization and condensation facilities as required in vapor phase desulfurizing operations. Hence, the invention provides a distinctly more simple and economical operation than has been achieved heretofore in the desulfurization of reformer stocks.

An embodiment of the invention which is especially efficacious as a feed preparation step for a reforming operation involves the treatment of a naphtha stock which, as available, has an end boiling point that is higher than desired for the reformer feed. For example, in operating a reformer for motor gasoline production, it is desirable to obtain from the crude petroleum all of the hydrocarbons therein that boil below about 400° F. and charge all of these to the reforming operation so as to obtain the maximum gasoline reformate yield; but in order to do this it is usually necessary to operate the crude oil distillation tower so as to obtain a naphtha fraction which has an end boiling point considerably above 400° F. This is due to the fact that conventional crude distillation units are capable of only relatively inefficient fractionation; hence it is necessary to cut the naphtha at a high end boiling point within the range of 400–500° F. in order to prevent loss of desired naphtha hydrocarbons to the next higher boiling fraction obtained from the unit. In common practice there is obtained from the distillation unit a light naphtha and a heavy naphtha which latter may boil, for example, in the range of 250–460° F. These naphtha fractions are generally reformed in separate operations. In reforming the heavier fraction it is customary practice to provide a prefractionator for separating the heavier hydrocarbons which boil above 400° F. and to utilize only the hydrocarbons boiling below 400° F. as the reformer feed. Under these circumstances where a prefractionator is available as a necessary adjunct to the reforming step, the present invention provides an especially cheap manner of desulfurizing the naphtha feed, since it utilizes the available prefractionator as the means for stripping hydrogen sulfide and dissolved hydrogen from the treated naphtha and accordingly eliminates any need for an additional stripping column.

The foregoing embodiment of the invention is described more particularly with reference to the accompanying sheet of drawings constituting a simplified diagrammatic flowsheet illustrating such embodiment.

For purpose of description it will be considered that the naphtha to be treated, as it is available from the crude distillation unit, has an initial boiling point above 200° F. and an end boiling point in the range of 400–500° F. A typical example is a naphtha having an A.S.T.M. boiling range of 260–460° F. This material is fed into the system through line 10 and into heat exchanger 11 wherein it is heated by means of hot product from the reformer which is introduced to the exchanger through line 12 and withdrawn therefrom via line 13. The desired temperature of the naphtha will vary somewhat depending upon the particular naphtha being treated and its boiling range, but it generally should be brought to within the range of 500–700° F. but in no event above the critical temperature of the material. For a naphtha having a boiling range of 260–460° F., a desulfurization temperature of about 590–610° F. is particularly satisfactory although higher or lower temperatures may be used. The naphtha flowing through the exchanger 11 and thence through line 14 to reactor 15 will be under sufficient pressure, due to the pressure maintained in the reactor, so that essentially no vaporization will occur.

The naphtha heated to the desired reaction temperature is fed into the top of reactor 15 and is distributed by means of a suitable distributor (not shown) onto the bed of catalyst 16 contained therein. This catalyst can be any known or suitable catalyst of the sulfactive hydrogenation type. A particularly effective and preferred catalyst which is commercially available comprises the oxides of cobalt and molybdenum carried on an alumina base and having a composition including about 2% CoO and about 8% $MoO_3$. A hydrogen-containing gas, which conveniently can be hydrogen obtained from the reformer, is fed through line 17 into the reactor as needed to maintain the desired pressure. It is essential that the pressure in reactor 15 be sufficient to maintain the naphtha charge essentially in liquid phase. The necessary minimum pressure for doing this will vary dependent upon the temperature used and the particular charge material being treated. Operating pressures generally will be within the range of 200–800 p.s.i.g. and typically may be about 400–500 p.s.i.g.

The liquid naphtha at temperature and pressure conditions as above specified percolates through the catalyst bed 16 in the presence of the hydrogen atmosphere in the reactor. Hydrogen diffuses from the vapor phase into the flowing hydrocarbon film on the catalyst and reacts with the organic sulfur compounds to convert them to hydrogen sulfide. After the operation has been started and equilibrium conditions have become established, the vapor phase in reactor 15, which remains static except for diffusion of hydrogen into the hydrocarbon phase and the replacement of such hydrogen by additional amounts added through line 17, will be saturated with hydrogen sulfide. Hence, essentially all the hydrogen sulfide formed in the hydrocarbon liquid by the reaction will remain dissolved therein and will be removed in solution in the hydrocarbons withdrawn from the reactor. It is noted also that under equilibrium conditions the vapor phase in reactor 15 will be saturated with vaporous hydrocarbons under the conditions prevailing, so that essentially no vaporization of the naphtha charge will occur as it enters the reactor.

The catalyst bed in reactor 15 preferably should have a ratio of total height to diameter less than 5:1, such as, for example, 2 or 3 to 1. These relatively low height to diameter ratios result in thinner films of the liquid naphtha on the catalyst surfaces. This reduces the time of diffusion of hydrogen into the liquid phase and improves the effectiveness of the desulfurizing operation. However, the process may be conducted with catalyst beds having higher height to diameter ratios if desired. The space rate in terms of volumes of naphtha per hour per volume of catalyst bed generally should be within the range of 3–15 and more preferably within the range of about 5–10. The liquid flow rate in terms of gallons per minute per square foot usually will be within the range of 6–25.

A liquid level, as indicated at 18, is maintained in the bottom of reactor 15 and the sole effluent removed from the reactor is the liquid withdrawn from line 19. The liquid naphtha so removed contains not only dissolved hydrogen sulfide but also dissolved hydrogen. The amount of the latter depends upon the temperature and pressure conditions maintained in the reactor and the particular naphtha stock being treated but typically is of the order of 25–35 cubic feet per bbl. of naphtha effluent (measured at standard conditions). In view of this relatively small amount of hydrogen removed from the reactor, it is economical to discard it from the system rather than to provide equipment for recovering and recycling it as previously explained.

The naphtha effluent is passed through pressure reducing valve 20 and into fractionating column 21 which is the prefractionator for the reformer. This column is operated to strip the hydrogen sulfide and hydrogen from the treated naphtha and at the same time fractionate the naphtha into hydrocarbon fractions boiling, respectively, above and below about 400° F. The hydrogen sulfide and hydrogen are removed through overhead line 22 and may, if desired, be sent to a sulfur recovery unit. The heavier naphtha fraction boiling in the approximate range of 400–460° F. is obtained from reboiler 23 at the base of column 21 while the lighter naphtha boiling below 400° F. is removed as a sidestream through line 24. In order to establish fractionating conditions in the column, it is necessary to add reflux to the top and this can readily be done by sending part of the lighter naphtha fraction through cooler 25, valve 26 and line 27 into the top of the column, the remainder being sent through line 28 to the reformer. In some cases there may be available in the refinery another reformer charge stock not requiring desulfurization, in which event such stock can be fed through valve 29 and lines 30 and 27 as reflux for the fractionating tower. In such case cooler 25 may be eliminated. A mixture of naphtha stocks suitable as charge for the reformer will then be obtained as the sidestream cut from column 21.

In cases where the charge naphtha originally has the desired boiling range for reforming so that prefractionation is not required, practice of the invention is carried out as described above, except that fractionating column 21 is merely a stripping column and does not function to separate the treated naphtha into different hydrocarbon fractions. In such case the treated naphtha is passed through a cooler to prevent hydrocarbon vaporization in the stripping column and then is introduced into the upper part of the column. Steam may be introduced at the bottom to effect countercurrent stripping of the hydrogen sulfide and hydrogen from the downflowing naphtha. Desulfurized product for feeding to the reformer is obtained from the base of the stripping column.

The following is a specific example illustrating conditions for a commercial operation embodying the invention:

A straight run naphtha having an A.S.T.M. boiling range of about 260–460° F. and containing 0.044% sulfur is preheated to about 605° F. and charged to a reactor containing a desulfurization catalyst. The catalyst is molybdenum oxide and cobalt oxide deposited on activated alumina, with the composition containing 8% $MoO_3$ and 2% $CoO$. The reactor has a diameter of 8 feet and contains two beds of the catalyst separated by means for redistributing the downflowing liquid, each of the beds having a height of 8 feet. Hydrogen obtained from the reformer is continuously fed into the reactor above the uppermost catalyst bed in amount to maintain the pressure at about 430 p.s.i.g. The naphtha is charged in amount of about 23,000 bbls./day and percolates downwardly through the bed at a space velocity of about 6.0 The treated naphtha withdrawn from the bottom is introduced into a fractionating column wherein the hydrogen sulfide and hydrogen are stripped from the hydrocarbons and the latter are separated into sidestream and bottoms fractions boiling below and above 400° F., respectively. A portion of the sidestream fraction is fed to the top of the column as reflux to maintain the desired fractionating conditions. There is obtained from the top of the column about 32 cubic feet of $H_2$ and 1.26 cubic feet of $H_2S$ (each measured at standard conditions) per bbl. of naphtha charged. Both the sidestream fraction and the bottom fraction are found to contain 0.005% sulfur, which is equivalent to a removal of about 89% of the sulfur. The sidestream fraction is then heated to a temperature of about 930° F. and is fed to a multi-case reformer in which a platinum-on-alumina reforming catalyst is used. Activity of the catalyst in the reformer remains high for a considerably longer time of operation than would be possible if the charge had not been desulfurized. Also the yield of reformate is about 2.3% higher than would be obtained by reforming the non-desulfurized feed under the same reaction conditions.

An added advantage in practicing the invention herein described, in addition to its desulfurizing effect, is that the desulfurizing treatment also effectively removes heavy metal components from the charge naphtha. For example, arsenic and lead if present in the naphtha are effectively removed by the desulfurizing catalyst described in specific example above. These metals are known to act as strong poisons on a platinum reforming catalyst, causing rapid deactivation of the catalyst. The herein-described desulfurizing treatment thus acts as an additional safeguard in protecting reforming catalysts against heavy metal compounds present in the feed naphtha.

We claim:

1. In the preparation of a naphtha feed stock for reforming in the presence of a sulfur-sensitive catalyst, the steps which comprise heating said naphtha to a temperature of 500–700° F. under sufficient pressure to maintain the naphtha in liquid phase, feeding the heated naphtha in liquid phase to a treating zone containing a bed of desulfurizing catalyst, feeding hydrogen to such zone and maintaining therein an atmosphere of hydrogen at a pressure above 200 p.s.i.g. and sufficient to keep the naphtha in liquid phase, percolating the naphtha at a temperature within the range of 500–700° F. and below its critical temperature through the catalyst bed whereby hydrogen dissolves in the naphtha and organic sulfur compounds are converted to hydrogen sulfide, maintaining above the effluent outlet a level of liquid naphtha, containing unreacted dissolved hydrogen and hydrogen sulfide, which seals the undissolved hydrogen atmosphere within the treating zone, withdrawing as effluent from the treating zone a stream consisting essentially of liquid naphtha containing dissolved hydrogen and hydrogen sulfide without withdrawing vapor phase hydrogen along with such effluent, feeding said stream to a fractionating column and operating said column to strip essentially all the dissolved hydrogen and hydrogen sulfide from the naphtha.

2. In the preparation of a feed stock for reforming in the presence of a sulfur-sensitive catalyst from a naphtha having an initial boiling point above 200° F. and an end boiling point within the range of 400–500° F., the steps which comprise heating said naphtha to a temperature of 500–700° F. under sufficient pressure to maintain the naphtha in liquid phase, feeding the heated naphtha in liquid phase to a treating zone containing a bed of desulfurizing catalyst, feeding hydrogen to such zone and maintaining therein an atmosphere of hydrogen at a pressure above 200 p.s.i.g. and sufficient to keep the naphtha in liquid phase, percolating the naphtha at a temperature within the range of 500–700° F. and below its critical temperature through the catalyst bed whereby hydrogen dissolves in the naphtha and organic sulfur compounds are converted to hydrogen sulfide, maintaining above the effluent outlet a level of liquid naphtha, containing unreacted dissolved hydrogen and hydrogen sulfide, which seals the undissolved hydrogen atmosphere within the treating zone, withdrawing as effluent from the treating zone a stream consisting essentially of liquid naphtha containing dissolved hydrogen and hydrogen sulfide without withdrawing vapor phase hydrogen along with such effluent, feeding said stream to a fractionating column and operating said column to strip essentially all the dissolved hydrogen and hydrogen sulfide from the naphtha and to obtain as a sidestream a desulfurized naphtha fraction having an end boiling point below 400° F. and a heavier naphtha fraction as bottom product from the column.

References Cited in the file of this patent

UNITED STATES PATENTS 2,770,578    Haensel _____ Nov. 13, 1956